United States Patent [19]

Chastain

[11] Patent Number: 4,562,516

[45] Date of Patent: Dec. 31, 1985

[54] ILLUMINATING SPINNER

[76] Inventor: Edward H. Chastain, 668 Commercial Ave., South San Francisco, Calif. 94080

[21] Appl. No.: 695,469

[22] Filed: Jan. 28, 1985

[51] Int. Cl.⁴ ............................................. B69Q 1/00
[52] U.S. Cl. .................................... 362/78; 362/191; 362/252; 362/800
[58] Field of Search ................... 362/78, 84, 190, 191, 362/249, 251, 252, 367, 368, 800, 806, 811, 121, 23, 26

[56] References Cited

U.S. PATENT DOCUMENTS

| | | | |
|---|---|---|---|
| 1,643,593 | 9/1927 | Styer et al. | 362/78 |
| 2,526,548 | 10/1950 | Franklin | 362/78 |
| 3,099,401 | 7/1963 | Bell | 362/78 |
| 3,113,727 | 12/1963 | Bradway | 362/78 |
| 3,340,389 | 9/1967 | Senseman | 362/78 |
| 4,308,572 | 12/1981 | Davidson et al. | 362/800 |
| 4,381,537 | 4/1983 | Hinrichs | 362/78 |
| 4,430,692 | 2/1984 | Papadakis | 362/249 |

Primary Examiner—Magdalen Y. C. Moy
Attorney, Agent, or Firm—T. R. Zegree

[57] ABSTRACT

An illuminating spinner adapted for detachably affixing to automobile wheel having center hub cap removed therefrom is described. The spinner comprises a plurality of wings having apertures in front walls thereof, a central front opening covered detachably by a cap and a closed rear wall. An adjustable adapter secured to each wing locks the spinner on the wheel. Electrical circuitry situated inside the spinner, including light-emitting diodes in the wings, provides illumination to the spinner.

16 Claims, 4 Drawing Figures

ILLUMINATING SPINNER

BACKGROUND OF THE INVENTION

This invention relates generally to a spinner adapted for mounting on an automobile wheel. More particularly, the invention relates to spinners, frequently referred to in the trade as "knock-off" which are adapted to provide illumination to the lower sides of certain types of motor vehicles.

Various types of spinner nuts for use on racing cars, sports cars and the like are well known. For example, U.S. Pat. No. 4,138,160 to Lohmeyer describes a simulated knock off wheel spinner combined with an adapter which is mounted on the wheel and locked in position by tightening a plurality of set screws. U.S. Pat. No. 4,191,427 to Bradley discloses a similar wheel spinner nut which is locked in position on the wheel by a plurality of rigid tabs maintained in place by set screws. The spinners described in these two patents, as well as those currently available on the market are, however, devoid of any lights associated therewith and therefore are not visible in the dark. Furthermore, attempts to provide illumination to automobile wheels have also been described in the patent literature. In U.S. Pat. No. 1,643,593 to Styer et al, an electric lamp is arranged between a pair of wheel spokes. U.S. Pat. No. 2,526,548 to Franklin discloses an electric light mounted in the hub cap of each rear wheel of a vehicle and connected with the regular lightening system of such vehicle, the light being directed by a reflector through two series of openings in the hub cap. U.S. Pat. No. 3,099,401 to Bell describes illumination means for automobile wheels comprising translucent plastic spinner provided with an electrical bulb and mounted on the central portion of the conventional metallic hub cap, the bulb being connected to the car battery. U.S. Pat. No. 3,113,727 to Bradway covers a lighting system for automobile hub caps having lamp sockets grounded to hub caps for holding incandescent bulbs and connected electrically to the automobile battery. U.S. Pat. No. 3,340,389 to Senseman shows a lighted automobile wheel cap provided with a light bulb mounted along the central axis of the wheel cap and receiving electrical power through a spring-loaded brush assembly connected to the power source.

While the aforementioned patents disclose either spinners alone with no illumination or various concepts of illuminating automobile wheel hub caps, the present invention provides a new approach to the structure of a spinner combined with illuminating means.

OBJECTS OF THE INVENTION

In view of the foregoing, it is the principal object of this invention to provide a new ornamental illuminating spinner for the wheels of an automotive vehicle.

Another object of the invention is to provide a novel illuminating spinner, the structure of which is adapted for firm attachment to a hub opening in a wheel of an automobile.

Still another object of the invention is the provision of a spinner in combination with a novel adapter for its mounting on a car wheel and with an autonomous electrical circuitry producing light which can readily be seen on the side of a car thereby enhancing the decorative effect of the spinner.

It is still another object of the invention to provide an illuminating wheel spinner adapted for easy mounting on an automobile wheel with its hub cap removed, the lighted spinner being clearly visible to drivers of passing automobiles, especially after sunset, thereby providing greater safety to persons riding in a car equipped therewith.

An even further object of the invention is the provision of a spinner which can be manufactured in large quantities at a relatively low cost from readily available materials.

These and other objects of the invention will become more fully apparent from the following description taken in conjunction with the accompanying drawing.

BRIEF SUMMARY OF THE INVENTION

In accordance with the preferred embodiment of the present invention, a generally circular illuminating spinner for an automobile wheel comprises, in combination, a body member having (a) a front opening therein, a closed rear wall and a side shoulder around the periphery of said front opening, a circular cap detachably affixed to the top portion of said shoulder thereby forming a closure for said front opening, a cavity inside said spinner encircled by said shoulder and a plurality of wings extending outwardly from said shoulder, each of said wings including a front wall having an aperture therein and a closed rear wall; (b) an adapter means secured to said rear wall of each of said wings for adjustably fastening said spinner to said wheel adjacent the hub opening thereof; and (c) electrical components forming circuitry disposed inside said spinner for providing illumination thereto comprising a light-emitting diode positioned within each of said wings, a manually operable switch means mounted in said side shoulder and a source of electrical energy in said cavity, said components being electrically interconnected.

BRIEF DESCRIPTION OF THE DRAWING

The invention will now be more fully described with reference to the accompanying drawing wherein.

DETAILED DESCRIPTION

Figure 1:
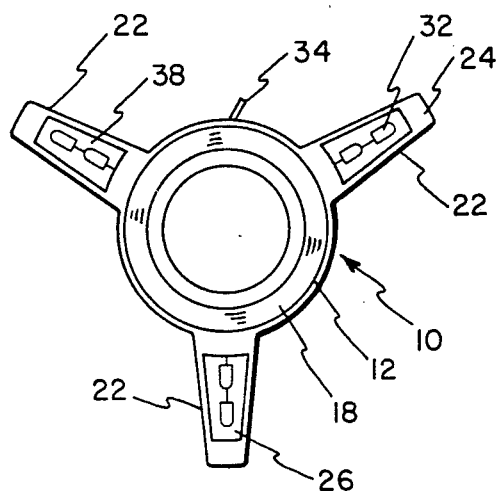
FIG. 1 is a front plan view of a spinner according to the invention.
Figure 2:
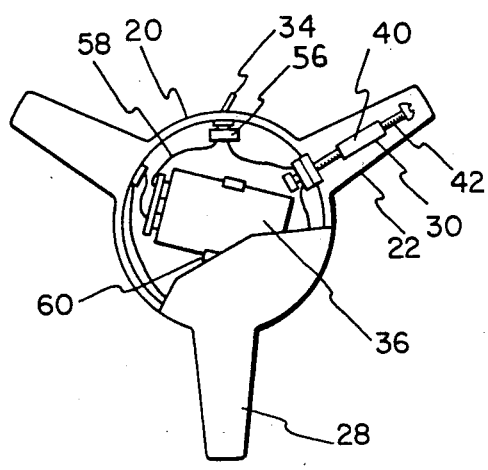
FIG. 2 is a broken rear plan view of the spinner with a portion of its rear wall removed to illustrate the arrangement of the electrical circuitry in the cavity and one adapter, the two other adapters not being shown.
Figure 3:
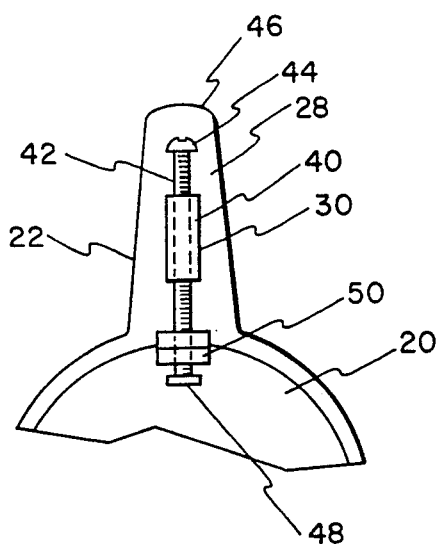
FIG. 3 is an enlarged fragmentary view of the rear portion of the spinner showing a detail of the adapter affixed to the rear wall of a wing.

Referring now to FIGS. 1 to 4 of the drawing, wherein similar reference characters designate corresponding elements, the illuminating spinner 10 of the present invention, as illustrated in FIG. 1 in its front position, comprises a generally circular body member having a large front opening (not shown), a circular shoulder 12 and a closed rear wall 16 partially shown in FIG. 2. A circular cap 18 is detachably affixed by any suitable means to the top portion of shoulder 12, such as by snapping it snugly onto the top portion of hub opening 14 or threadedly mounting it thereon. Spinner 10 includes a large size cavity 20 of circular crosssectional configuration adapted to receive a portion of the electrical components which will be described hereinafter. In order to gain access to cavity 20, cap 18 can readily be detached from shoulder 12.

The structure of each wing 22 extending outwardly from shoulder 12 includes an aperture 26 in front wall 24 extending lengthwise over the major portion thereof and preferably arranged so that the perimeter of each aperture 26 is substantially parallel to the outer perimeter of front wall 24. The rear wall 28 is completely closed and extends from the top of wing 22 down to the outer surface of shoulder 12. Apertures 26 are shielded with a translucent or transparent glass-like cover 38, such as a suitable hard and rigid plastic material usually employed to protect front lights or tail lights of automobiles. To enhance the illuminating effect of spinner 10, especially in the dark, the plastic material may be colored red, green, yellow or any other color. However, colorless plastic covers are likewise satisfactory. Covers 38 are securely attached to the edge portions of apertures 26 by any suitable manner, such as by slidably inserting them in grooves provided in the inner edge portion of the apertures 26.

Figure 4:
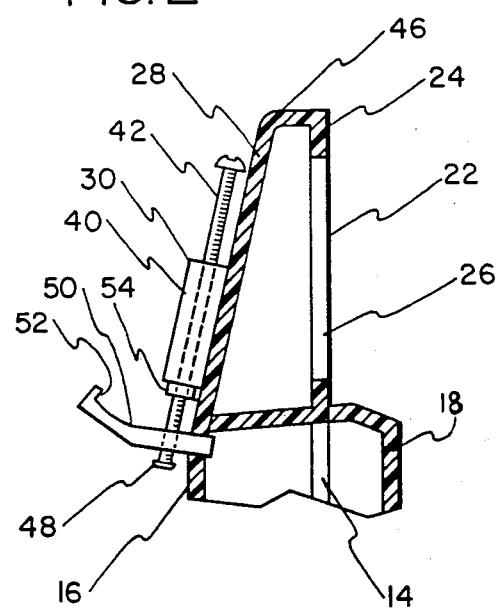
FIG. 4 is an enlarged, partially sectional side view of a wing with an adapter integral with its rear wall and a portion of a circular cap mounted over the front opening in the spinner.

Although the number of wings 22 in spinner 22 may vary from two to four or even more, if desired, the preferred structure of spinner 10, as shown in FIGS. 1 and 2, includes three wings 22 spaced apart around the circumference of shoulder 12 by a substantially equal distance and being slightly inclined forwardly in relation to the front center portion of spinner 10, as shown in FIG. 4.

In order to fasten spinner 10 to a wheel of an automobile, adapter 30 is secured to rear wall 28 of each wing 22 in a suitable manner. As shown in detail in FIGS. 3 and 4, adapter means 30 comprises a stationary cylindrical sleeve 40 preferably formed of the same material as the body of spinner 10 and affixed integrally to rear wall 28. When a plastic material is employed in the manufacture of the spinner, sleeve 40 may be molded with rear wall 20 forming a unitary piece therewith. Sleeve 40 is threaded internally to enable elongated threaded screw 42, the covered portion of which is represented in dashed lines, to pass therethrough by turning it for adjustable mounting of spinner 10 to a wheel rim. The upper end of screw 42 is provided with head 44 positioned somewhat below the distal edge 46 of each wing 22, while the opposite end of screw 42 extends somewhat below the inner portion of shoulder 12 and comprises affixed thereto a small stopper means 48 disposed transversely thereof. A swiveling arm 50 adapted for locking engagement with a rim portion of an automobile wheel extends transversely outwardly from screw 42 and is provided with a hole having a diameter slightly larger than that of screw 42 for a free passage of the screw therethrough. Arm 50 comprises an upwardly inclined distal lip 52, the upper surface of which engages the wheel rim after adapter 30 has been tightened thereto. The opposite short end portion of arm 50 extends inwardly for engagement of its upper surface with the inner wall of shoulder 12. Accordingly, spinner 10 is firmly secured to the wheel rim when adapter 30 is properly adjusted in position and the screw 42 is tightened.

It is an important feature of the invention that the structure of the adapter means 30 permits adjustment of spinner 10 to the size of a wheel rim which is effectuated by rotation of the sole screw 42 until a tight frictional engagement of arm 50 with the rim is produced. In order to hold sleeve 40 in place in a desired position, a threaded nut 54 is mounted on screw 42 underneath sleeve 40 thereby preventing its movement when not required.

In order to create the desired illuminating effect, spinner 10 is provided with electrical components which form closed circuitry disposed in the interior thereof. Such components comprise essentially commercially available light-emitting diodes 32, preferably a pair of connected diodes positioned within each wing 22 and a manually operable mechanical on-off switch 34 providing intermittent illumination when desired and located in the side shoulder 12 between a pair of wings 22. Switch means 34 includes a mounting member 56 threadably inserted through a hole provided in shoulder 12 and fastened thereto by a nut or the like fastener.

As a source of electrical energy, a battery 36 disposed within the cavity 20 is secured to the inner surface of closed rear wall 16 by suitable clamp means 60, preferably on each side of battery 36 thereby holding it in place. A 9 volt battery, preferably rechargeable, is very satisfactory for providing sufficient power for the diodes. The diodes 32 are electrically connected in series with the terminals of battery 36 and with switch 34 by insulated conductors 58 in the usual manner. Conductors 58 are located in cavity 20 are slidably inserted into holes provided therefor in shoulder 12 adjacent each of the wings 22 for welded connection with diodes 32. Spinners 10 may optionally be electrically connected by wiring led to a separate switch mounted on the dashboard of an automobile in which case switch 34 may not be required.

The complete circuitry described hereinabove provides spinner 10 with illumination which can be readily seen through covers 38 when switch 34 is moved from an "off" position to "on" position.

The body of spinner 10, including circular cap 18, according to the invention may be fabricated from aluminum, steel or from a suitable rigid plastic material by any of the known molding methods. The adjustable adapters affixed to the wings permit mounting of the spinner on different types of automobile rims having hub openings of somewhat varying diameter.

It will be apparent from the foregoing description that I have devised an improved ornamental illuminating spinner for attachment to automobile wheels characterized by a new combination of structural elements and features which are required for its basic function. The spinner is useful particularly for mounting on wheels of sports cars, low riders, high riders, vans and other motor vehicles as it produces a clearly visible sight when lit in the dark to drivers of other cars passing in adjacent lanes thereby providing an important safety feature to the driver and passengers of the automobile equipped therewith. The spinner can be very easily installed in a locked position of use by any person having ordinary skills by merely exposing the central hub opening in the wheel rim and securing the spinner thereto using simply a screwdriver.

It will be understood that various modifications in the form or in the constructional details of my invention as herein described may be made without departing from the spirit thereof or the scope of the claims which follow.

I claim:

1. A generally circular illuminating spinner for automobile wheel comprising, in combination, a body member having (a) a front opening therein, a closed rear wall and a side shoulder around the periphery of said front opening, a circular cap detachably affixed to top portion of said shoulder thereby forming a closure for said front opening, a cavity inside said spinner encircled by said shoulder, a plurality of wings exending outwardly from said shoulder, each of said wings including a front wall having an aperture therein and a closed rear wall;

(b) an adapter means secured to said rear wall of each said wings for adjustably fastening said spinner to said wheel adjacent hub opening thereof; and (c) electrical components forming circuitry disposed inside said spinner for providing illumination thereto comprising a light-emitting diode positioned within each of said wings, a manually operable switch means mounted in said side shoulder, a source of electrical energy in said cavity, said components being electrically interconnected.

2. The spinner of claim 1, wherein said circular gap is snapped onto said top edge portion of said front opening.

3. The spinner of claim 1, wherein said circular cap is threadedly mounted on said top edge portion of said front opening.

4. The spinner of claim 1, wherein said apertures in said wings extend lengthwise over a major portion of said front wall thereof.

5. The spinner of claim 1, wherein perimeters of said apertures in said wings are substantially parallel to outer perimeters of said front wall thereof.

6. The spinner of claim 1, wherein said apertures in said wings are covered with a translucent glass-like material.

7. The spinner of claim 1, wherein said body member comprises three wings spaced apart by a substantially equal distance.

8. The spinner of claim 1, wherein said adapter means comprises a stationary internally threaded sleeve affixed integrally to said rear wall of said wing, a threadedly disposed screw therein, the head of said screw being positioned somewhat below the distal edge of said wing, the opposite end of said screw extending somewhat below the inner portion of said shoulder and having affixed thereto a stopper means disposed trasversely thereof, a swiveling arm extending transversely from said screw, said arm having a hole for free passage of said screw therethrough and an upwardly inclined distal lip, said arm being adapted for locking engagement with rim portion of said wheel.

9. The spinner of claim 8, wherein said adapter means is adjustable to the size of hub opening in said rim by rotation of said screw to a tight engagement of said arm with said rim.

10. The spinner of claim 8, wherein a threaded nut is mounted on said screw underneath said sleeve to hold said sleeve in place.

11. The spinner of claim 1, wherein said electrical components include a pair of diodes within each of said wings.

12. The spinner of claim 1, wherein said source of electrical energy is removably secured battery.

13. The spinner of claim 1, wherein said switch means includes a mounting member threadedly inserted through a hole in said shoulder and fastened thereto.

14. The spinner of claim 12, wherein said diodes are electrically connected with said battery and said switch means by insulated conductors slidably inserted into holes provided in said shoulder adjacent each of said wings.

15. The spinner of claim 12, wherein said battery is secured to inner surface of said closed rear wall with clamping means attached thereto.

16. The spinner of claim 6, wherein illumination thereof can be seen through said translucent glass-like material when said switch means is moved from an off position to an on position.

* * * * *